United States Patent [19]
Barnhart et al.

[11] Patent Number: 5,912,892
[45] Date of Patent: Jun. 15, 1999

[54] METHOD OF PROVIDING FRACTIONAL PATH SERVICE ON AN ATM NETWORK

[75] Inventors: Andrew W. Barnhart, Gaithersburg; Lawrence R. Kreeger, Ivamsville, both of Md.

[73] Assignee: Hughes Electronics Corporation, El Segundo, Calif.

[21] Appl. No.: 08/706,159

[22] Filed: Aug. 30, 1996

[51] Int. Cl.⁶ .................................................. H04L 12/56
[52] U.S. Cl. ........................... 370/397; 370/409; 370/905
[58] Field of Search ..................... 370/397, 399, 370/401, 409, 395, 396, 400, 905

[56] References Cited

U.S. PATENT DOCUMENTS

| | | | |
|---|---|---|---|
| 5,440,547 | 8/1995 | Easki et al. | 370/395 |
| 5,467,349 | 11/1995 | Huey et al. | 370/397 |
| 5,691,985 | 11/1997 | Lorenz et al. | 370/401 |
| 5,719,864 | 2/1998 | Badger et al. | 370/397 |

*Primary Examiner*—Alpus H. Hsu
*Attorney, Agent, or Firm*—John T. Whelan; Michael W. Sales

[57] ABSTRACT

A method of routing Asynchronous Transfer Mode (ATM) connections in a network. A Virtual Path Index (VPI) and a Virtual Channel Index (VCI) identify connections in the network. The bits of the VPI and VCI are selectively allocated, allowing for an increased number of paths in the network. Fractional paths are thereby created, increasing the routing capabilities of the network. Multiplexing of paths in the network further enhances the network routing capability. Cells containing data are switched on the connections in the network. A plurality of tables in the ATM hardware stores a VPI value and a value representing the number of significant bits allocated to the VPI for the purpose of switching cells. Cells with the same VPI are routed over the same paths as dictated in part by the values in the corresponding tables.

18 Claims, 3 Drawing Sheets

| | VPI \| VCI | VPI SIGNIFICANCE | PORT |
|---|---|---|---|
| EXAMPLE ENTRY | | | PATH TYPE DESIGNATION |
| 1) | 41\| XXXXX | 08 BITS | SUPER PATH |
| 2) | 512\|XXXX | 12 BITS | FULL PATH |
| 3) | 5678\|XXX | 16 BITS | FRACTIONAL PATH |
| 4) | 6789AB\| X | 24 BITS | FRACTIONAL PATH |
| 5) | 1234567 | 28 BITS | SPECIFIC VPCI |

METHOD OF PROVIDING FRACTIONAL PATH SERVICE ON AN ATM NETWORK

BACKGROUND OF THE INVENTION

An Asynchronous Transfer Mode (ATM) network typically consists of a plurality of physical hardware switches. Each switch typically has multiple ports wherein cells of data are switched from one port on the switch to another port on the switch. Connections are used to define ports on a given switch and are identified by a Virtual Path Index (VPI) and a Virtual Channel Index (VCI). The combination of VPI and VCI is commonly known in the art as VPCI. Cells switched on connections are routed in part using virtual paths indexed by a VPI. A virtual path exists between two nodes in a network. The term node, as used herein, is typically representative of a switch in the network. Similarly, the terms "path" and "virtual path" are synonymous for the purposes of this discussion and are also used interchangeably.

On a Network to Network Interface (NNI), a VPI typically consists of 12 bits, or 4,096 possible values, and the VCI typically consists of 16 bits, or 65,536 possible values. Therefore, a resulting network in an NNI can ordinarily have no more than 4,096 different values for virtual paths. Since there are 65,536 possible virtual channels on each path and only 4,096 possible paths, a full path is a scarce resource in a network. The more channels that are available on a network, the less likely that a particular channel will be matched to any particular node in the network. Hence, where only a few channels exist between two nodes in a network, a full path may be tied up to service those few channels. This would be neither efficient or economical from a network administration viewpoint.

In practice, network users are generally offered a number of qualities of service (QOS). A QOS may simply be a destination in the network desirable to a particular customer. Each QOS offered may require assignment to a separate path. If, for example, there are 8 such QOSs and 200 nodes on the network, then the network must have the capability of handling 318,400 (8 * 200 * 199) paths. This is clearly beyond the 4,096 paths that can be addressed by a 12 bit VPI. In fact, a network could not grow much beyond 20 nodes with a 4,096 path limit, assuming unique VPI numbering within the network. As user network requirements continue to increase and networks become overburdened, it has become desirable to develop methods to increase the number of available paths within networks.

One method of routing data between connections in a network uses software driven packet switching networks. Because the length of a packet in such a network is variable by software methods, the inclusion of a higher level header within the packet is possible. In an ATM network application, such a header could be used to extend the addressing and multiplexing capabilities of the network. This is desirable because it allows the number of virtual paths to be increased or decreased, optimizing the efficiency of the network. The higher level header could be stripped off before delivery to a user, thereby being transparent to devices outside the network. Though this may be desirable in certain applications, the speed of data transfer in such a software driven packet switching network is inherently limited by the software processing speed, notwithstanding the capabilities of the hardware.

Because hardware driven networks can transfer data at much higher rates than is possible in software based packet switching networks, most ATM networks are hardware driven. Hardware driven networks transfer data in fixed hardware packets called cells. The cells ordinarily contain both data and address information, with the number of bits for a cell being fixed. Since there is no provision for a higher level header within a cell in a fixed hardware unit, neither address extension or multiplexing can ordinarily be achieved. Therefore, a fixed hardware unit, while faster than a software driven packet switching network, inherently limits the path routing capabilities of a network.

SUMMARY OF THE INVENTION

In general, the method of the present invention provides for address extension to increase the number of virtual paths in a hardware driven ATM network. The present invention does this by allowing the number of VPI or VCI bits which identify a connection in a network to be selectively allocated depending on the interconnection needs of a particular network or user. [it will be understood that the term interconnection as used herein refers to a physical connection or any other method of connection between two networks known by those skilled in the art.] For example, a particular connection could be configured to have a 20 bit VPI and an 8 bit VCI, allowing for 1,048,576 paths, with each path having up to 256 VCIs. This offers a significant increase over the 4096 paths offered in a 12 bit VPI system. Accordingly, the routing capability of the network increases as more paths become available for routing. Additionally, the needs of individual networks and users can be satisfied more efficiently.

More particularly, the methods of the present invention optimize the interconnection between a first network and a second network by selectively allocating a number of path bits to the VPI of the first network. The selective allocation of path bits corresponds at least in part to the interconnection requirements of the second network. The method of the present invention also provides for selectively allocating a number of channel bits to the VCI corresponding at least in part to the interconnection requirements of the second network. The number and character of the path and channel bits optimize the interconnection between the networks by allowing for increased routing capabilities within the first network.

BRIEF DESCRIPTION OF THE DRAWINGS

Embodiments for providing these and other desirable routing capabilities in accordance with the invention can be best understood by referring to the accompanying drawings where.

DETAILED DESCRIPTION OF THE EXEMPLARY EMBODIMENTS

Figure 1:
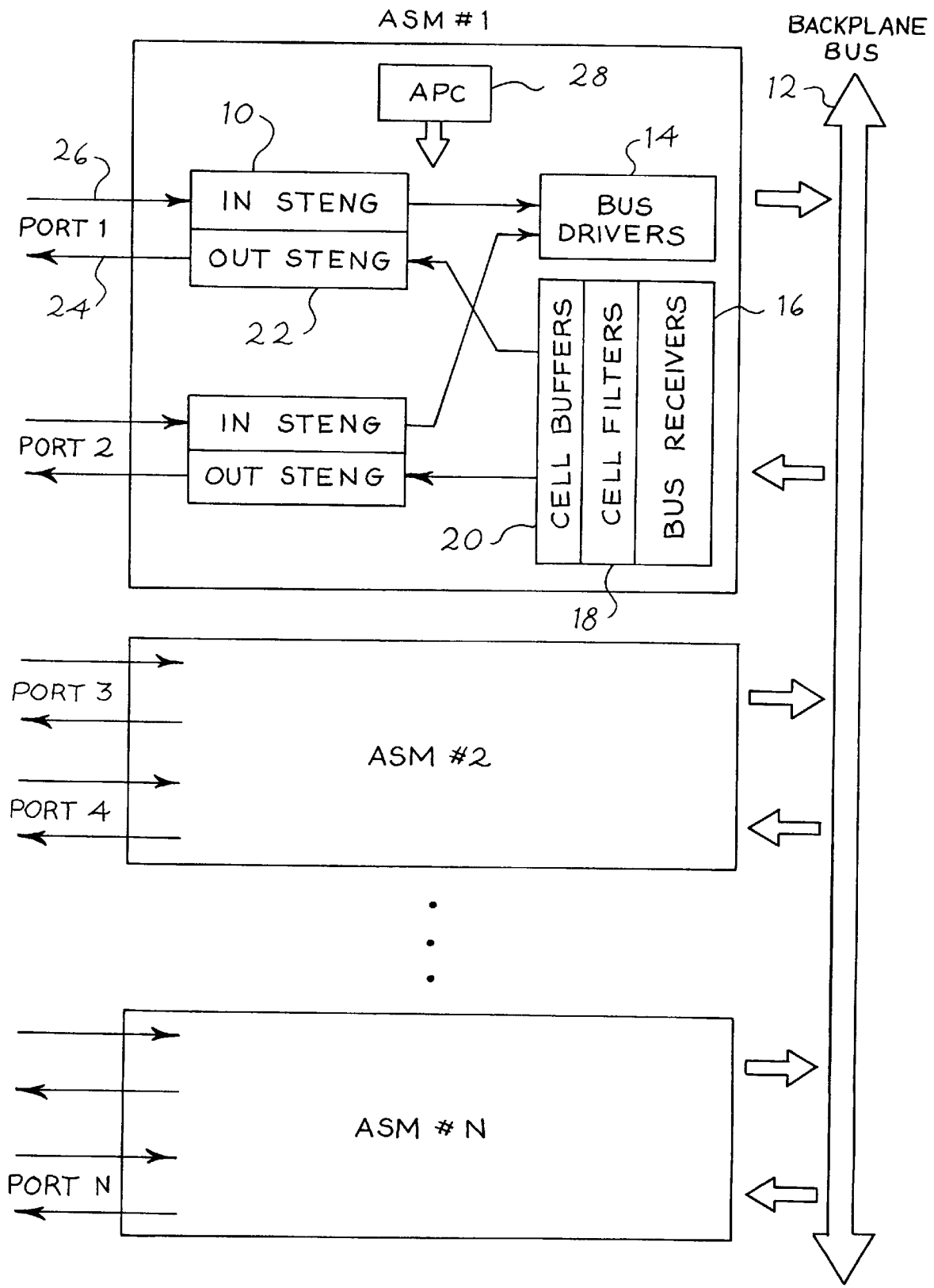
FIG. 1 is an illustration of a preferred ATM switching architecture wherein the present invention may be utilized.

FIG. 1 illustrates one of many possible ATM switching architectures in which the present invention may be used, and is a preferred architecture. Circuitry incorporating a preferred embodiment of the present invention is designated as In STENG 10. This circuitry is used in adaption switching modules, one or more of which may be employed in an ATM switch. In FIG. 1, "N" ASM modules are employed. Each ASM supports a bi-directional connection to two physical ports. Thus, there are a total of 2 times N ports presented. Of course, other ASM designs may have a different number of ports implemented and shall remain within the scope of the present invention. Here, ASMs 2 through N are identical to ASM #1. Cells of data may be transferred between ASMs by means of the Backplane Bus 12. This transfer process employs Bus Drivers 14 and Bus Receivers 16 and uses techniques well-known in the art.

An ATM cell arrives at an ATM switch from a cell transmission media via a physical port such as the input port 26 of FIG. 1. The cell is then presented to the In STENG 10. A main purpose of the In STENG 10 is "port-tagging," in which the In STENG 10 ascertains the desired exit port of the switch for the cell, multiplexes a tag onto the cell and places the desired exit port number within the tag. The cell is then placed on the Backplane Bus 12 by means of the Bus Drivers 14.

In the switch architecture approach of the present invention, each ASM connected to the Backplane Bus 12 is accessible to cells from all of the input ports. However, each ASM will only receive cells destined for the particular ASM output port(s). It is intended that the cell exit the switch via a designated physical port such as Port 4.

The Cell Filter 18 for a port examines the tags of all cells arriving from the Backplane Bus 12 via the Bus Receivers 16. The cells are passed, via the Cell Buffers 20, to the port indicated by the tags. Other cells are discarded. The Out STENG 22, takes a cell from the cell buffer 20, removes the tag, and delivers the cell to the output port 24.

The APC 28 (application processor circuit) of an ASM has a bussed connection to the Cell Filters 18 and to a CAM (Contents Addressable Memory) mechanism. Under the direction of a network operator, the APC 28 loads the Cell Filters 18 with the port numbers of an ASM. Thus, cells arriving at the input port of one ASM may be properly delivered to the designated output port of another ASM.

Figures 2, 3:
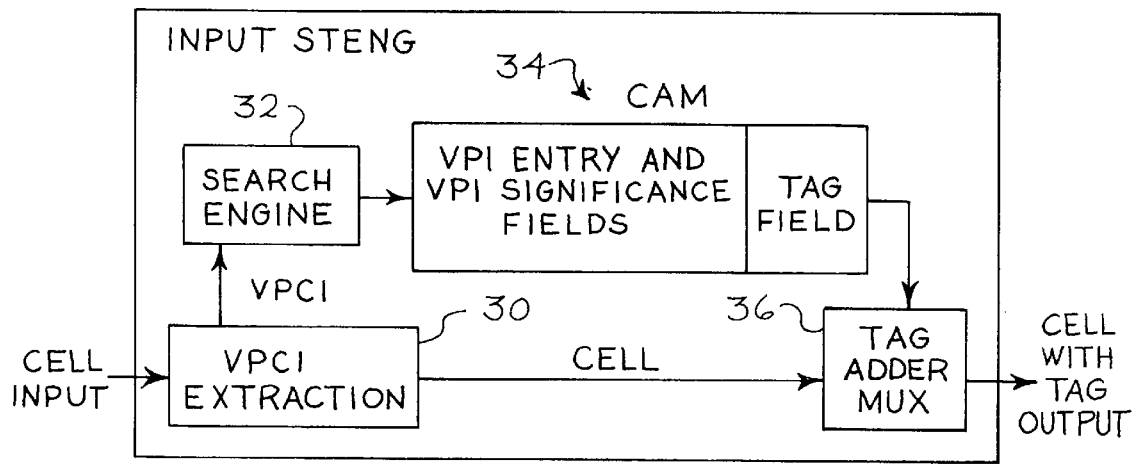
FIG. 2 is a top-level block diagram of circuitry employed in the ATM switching architecture of FIG. 1, in accordance with the principles of the present invention.
FIG. 3 is an example of a VPCI table in an ATM hardware network for the purpose of routing cells in accordance with the principles of the present invention.

FIG. 2 is a top-level block diagram for an In STENG. It contains a VPCI Extraction mechanism 30, a Search Engine 32, a Contents Addressable Memory (CAM) 34 mechanism and a Tag Adder Mux 36. The CAM 34 implements a VPCI table by including "VPI" entries loaded from the APC. Each such entry specifies for a particular virtual channel the output port to be used for any cells belonging to that virtual channel.

Each cell arriving at a switch is associated with a particular virtual connection by means of its VPI and its VCI, the combination of which is designated as the VPCI of the cell. As the number of possible VPCIs exceed 200 million ($2^{28}$), it is not practical to implement RAM memory using the VPCI as a RAM address. Rather CAM is used, and in the present invention, the CAM may contain only that portion of a VPCI that is significant.

The VPCI Extraction mechanism 30 obtains the VPCI of a cell, delivers this VPCI to the Search Engine 32, and delivers the cell to the Tag Adder Mux 36. The Search Engine 32 uses the VPCI to examine the VPCI wildcard field of the CAM 34 to obtain a match with the VPCI from the cell, which may be fully specified, and an entry in the CAM field, which may have wildcards. A match designates the CAM row for the cell, from which the desired exit port number for the cell is obtained. The Tag Adder Mux 36 adds a tag to the cell and places the port number into the tag. An Input STENG then places this tagged cell at its output.

The present invention is a method of selectively allocating the number of bits in the VPI and VCI fields of an ATM network. As is well known in the art, a bit refers to a binary digit, and the character of a bit refers to the nature of a bit, i.e., whether it is an "1" or a "0". Selectively allocating the number of bits in VPI and VCI fields enables a large number of virtual paths to be accommodated. This is desirable so that cells containing data and address information may be routed more efficiently within a network.

The present invention also provides the benefit of logical multiplexing of virtual paths in the network. The requirements of interconnecting networks can be more efficiently satisfied where more paths are available for routing through address extension and multiplexing. It will be understood that an "interconnecting network" could be a network, a user network, a sub-network, or any type of network known in the art that would come within the scope of the embodiments of the present invention. Similarly, it will be understood that the term "interconnection" as used herein refers to a physical connection or any other method of connection between two networks known by those skilled in the art.

Referring now to FIG. 3, there is shown a typical VPCI table existing in the ATM hardware for the purpose of routing cells between connections in an ATM network. It will be understood that the table could exist in a variety of hardware devices without departing from the scope of the present invention. This could include, for example, programmable devices, custom chips or any other such device known in the art for storing data. The table includes a field for storing a value representing the number of path bits to be selectively allocated to the VPI. The number of path bits dictates which bits of a routed cell are to be used for routing the cell along the paths in the network. The VPI and VCI values of the routed cell are then matched to the VPI and VCI values of a particular connection to determine the cell's final destination.

Still referring to FIG. 3, a hexadecimal representation of the VPCI bit pattern is used for illustration simplicity, wherein seven hex digits are equivalent to the standard 28 bits in the VPCI hardware table. Entries in the table illustrate some of the VPCI divisions which are possible. In accord with the present invention, the actual division could be on bit boundaries other than those shown in the table, e.g. 15 bits allocated to the VPI and 13 bits allocated to the VCI.

Example entry number 1 provides an example of the case where the size of the VPI field is less than 12 bits, a situation referred to herein as a "super path." Because a full path would be characterized by a 12 bit VPI index, allocating less than 12 bits will typically only be useful where paths are not a scarce resource in a network. A super path is therefore primarily useful for path multiplexing within the network. Example entry number 2 represents a standard full path, having a 12 bit VPI, 16 bit VCI division. VPIs which utilize more than 12 bits are referred to herein as "fractional paths." In terms of increased routing capabilities, full path multiplexing will not achieve the same economies as fractional path multiplexing because cells in the network are routed along fewer paths.

Example entries number 3 and 4 in FIG. 3 illustrate different choices for fractional paths. The use of fractional paths provides for a much larger number of paths within a network, especially at the periphery of the network where the multiplexing possibilities are greater.

Example entry number 5 illustrates a specific virtual connection, in that its VPCI is fully specified by the VPI only. Because the VCI is rendered null in this case, any cell whose routing is dictated by a fully specified VPCI would be routed to a specific user connection in the network. This is the limiting case for fractional paths.

In an alternative embodiment of the present invention, the VPCI bit division in a table could be accomplished by storing the number of bits of significance of the VCI instead of the VPI.

Yet another alternative embodiment would involve storing a bit map in the table indicating a partition position between the VPI and VCI. Essentially, the value of the bit map would indicate the bits of the VPCI which are significant. The value in the bit map could vary on any number of factors. More flexibility is gained because the VPI and VCI significance could vary depending on the value in the bit map. Only five bits would be necessary to place the partition position anywhere among the typical 28 bits of the VPCI.

Figure 4:
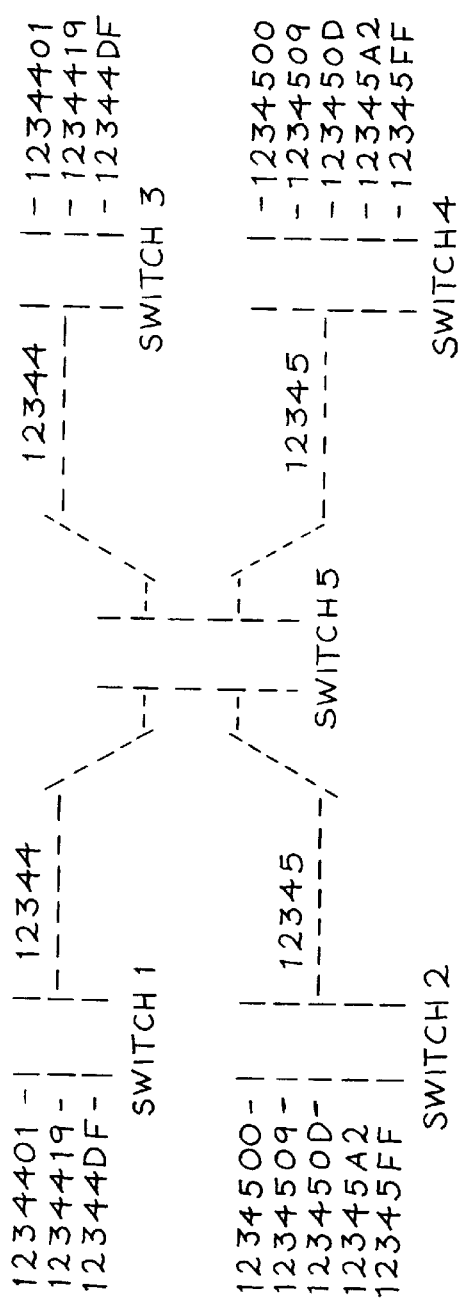
FIG. 4 illustrates the multiplexing of several paths in an ATM network in accordance with the principles of the present invention.

The present invention further provides for the multiplexing of paths into specific user connections. FIG. 4 provides an example of the use of the present invention in the multiplexing of paths, both paths shown in FIG. 4 having 20-bit VPI significance. In FIG. 2, switches 1 through 4 provide the multiplexing function. VPCIs are represented by hexadecimal digits in FIG. 4.

In practice, each switch in a network may combine hundreds or thousands of such user connections, and may require many such fractional paths. The large quantity of such paths that are made available by this invention allows for large network capacity, providing for switches of considerable size and/or a large number of switches within the network.

Switch 5 in FIG. 4 illustrates a network transit or hub node, wherein paths are routed between various network switches. Using an implementation of the aforementioned VPCI table, all cells which start with a VPI which matches the significant bits in the table would be routed over the same virtual path. The VCI part of the VPCI would be ignored. For example, the VPCI table of Switch 5 would contain entries for paths 12344 and 12345, but not the individual user connections such as 1234509.

Figure 5:
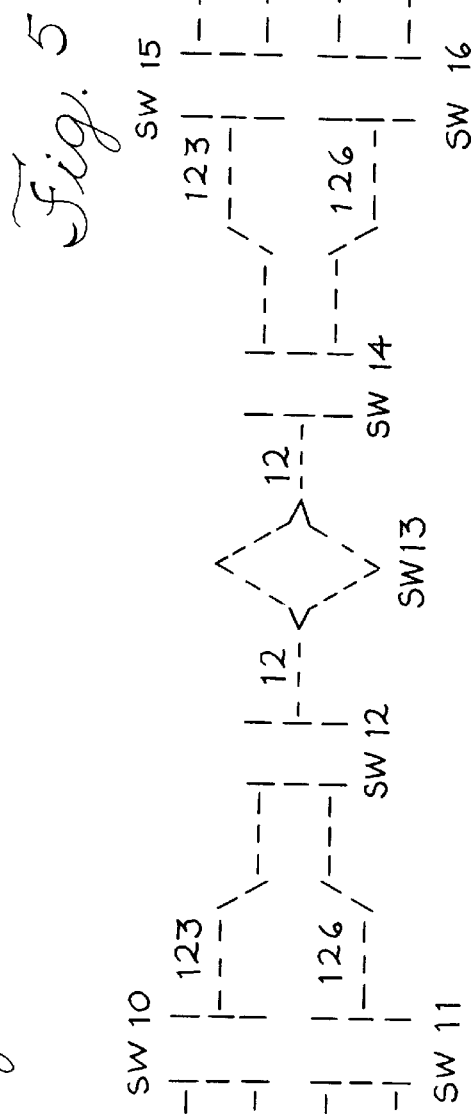
FIG. 5 illustrates the multiplexing of several paths in an ATM network which includes a sub-network, in accordance with the principles of the present invention.

In concept and practice, switches 1 through 4 may be further apart than illustrated in FIG. 4. This would occur, for example, where one switch is replaced by a sub-network of several switches. FIG. 5 illustrates such a situation. More particularly, as is clear from FIG. 5, switch 5 of FIG. 4 has been replaced by a sub-network consisting of switches 10 through 16. Switch 13 could be a single switch or another sub-network. FIG. 5 thus represents an example of how paths can be further logically multiplexed and demultiplexed, with two or more levels of path multiplexing. The result is the creation of even more paths and greater network routing capabilities.

Switches 1–4 in FIG. 5 provide the same function as in FIG. 4. Switches 21–24 also provide a similar function, combining user connections into paths 12622 and 126A9. Switch 10, in contrast, illustrates the multiplexing of fractional paths 12344 and 12345 into full path 123. In practice, many such fractional paths could be combined to form path 123. Switch 15 provides for the demultiplexing of path 123. Similarly, switches 11 and 16 provide for the multiplexing and demultiplexing of path 126. Accordingly, subsequent switches, such as switch 12 for example, need only to be programmed for a full path.

Switches 12 and 14 provide for the multiplexing and demultiplexing of full paths 123 and 126 into super path 12. Therefore, Switch/sub-network 13 can be programmed for only super path 12, rather than the individual paths 123 and 126.

In an exemplary operation of the methods of the invention, there typically exists a first network comprising a plurality of switches, a VPI and VCI for identifying connections, and a second network. Instead of a fixed number of bits for the VPI and VCI, typically 12 and 16 in standard NNI, the present invention provides for a more flexible ATM network. Assuming the second network has significant interconnection requirements, a VPI of 16 path bits and a VCI of 12 channel bits can be selectively allocated for the first network. This permits for an increased number of paths known as fractional paths, to be used for switching cells and routing connections within the first network. Paths in the network are multiplexed, essentially bundling groups of connections for routing in the first network. A plurality of tables exist in the network having at least a VPI field and a field indicating the bits of the VPI field which are significant. All cells which start with a VPI which matches the significant bits of the VPI field in the table would be routed over the same virtual path. Thus, economies are achieved by bundling connections, effectively achieving more efficient use of the paths in the network. Connections are ultimately demultiplexed upon reaching particular destinations in the network.

Though the embodiments disclosed herein are preferred, additional embodiments, modifications and alternatives which do not part from the true scope of the invention may be apparent to those skilled in the art. Accordingly, all such embodiments, modifications and alternatives are intended to be covered by the appended claims.

We claim:

1. In an ATM system, including a first network having a plurality of hardware connections, identified by a virtual path index (VPI) and a virtual channel index (VCI), and a second network having requirements for interconnections with at least some of said connections in said first network, a method for optimizing the interconnection between said second network and said first network, comprising the steps of:

selectively allocating a number of path bits to said VPI corresponding at least in part to the interconnection requirements of said second network;

selectively allocating a number of channel bits to said VCI corresponding at least in part to the interconnection requirements of said second network, whereby the number and character of said path bits and said channel bits optimize the interconnection between said second network and said first network; and storing values representing said number of path bits allocated to said VPI and said number of channel bits allocated to said VCI.

2. The method of claim 1 wherein the step of storing values representing said number of path bits allocated to said VPI and said number of channel bits allocated to said VCI comprises providing at least one table in said first network, said at least one table having a field for storing a value representing said number of path bits allocated to said VPI.

3. The method of claim 1 wherein the step of storing values representing said number of path bits allocated to said VPI and said number of channel bits allocated to said VCI comprises providing at least one table in said first network, said at least one table having a field for storing a value representing said number of channel bits allocated to said VCI.

4. The method of claim 1 wherein the step of storing values representing said number of path bits allocated to said VPI and said number of channel bits allocated to said VCI comprises providing at least one table in said first network, said at least one table having a field for storing a value representing a partition position between said VPI and said VCI.

5. The method of claim 1 further comprising the step of providing a cell in said first network, and routing said cell to a path identified by the number and the character of said path bits.

6. The method of claim 1 further comprising the step of providing a plurality of cells in said first network, and routing said cells to a channel identified by the character of said channel bits.

7. The method of claim 1 further comprising the step of multiplexing and demultiplexing a plurality of paths in said first network.

8. The method of claim 1 wherein said connections in said first network are identified by the number and character of said path bits and said channel bits.

9. The method of claim 1 wherein the sum of the number of selectively allocated path bits and channel bits is 28.

10. The method of claim 1 wherein the number of selectively allocated path bits is between 1 and 28.

11. In an ATM system, including a first network having a plurality of hardware connections, identified by a virtual path index (VPI) and a virtual channel index (VCI), and a second network having requirements for interconnections with at least some of said connections in said first network, hardware in said first network for optimizing the interconnection between said second network and said first network, comprising:

a memory device storing values representing a number of path bits allocated to said VPI and a number of channel bits allocated to said VCI, wherein said number of path and channel bits are selectively allocated to said VPI and VCI corresponding at least in part to the interconnection requirements of said second network, whereby the number and character of said bits optimize the interconnection between said second network and said first network.

12. The hardware of claim 11 wherein said memory device is a contents addressable memory device.

13. The hardware of claim 11 wherein said memory device has at least one table, said at least one table having a field for storing a value representing said number of bits allocated to said VPI.

14. The hardware of claim 11 wherein said memory device has at least one table, said at least one table having a field for storing a value representing said number of bits allocated to said VCI.

15. The hardware of claim 11 wherein said memory device has at least one table, said at least one table having a field for storing a value representing a partition position between said VPI and said VCI fields.

16. The hardware of claim 11 further comprising a cell in said first network, said cell being routed to a path identified by the number and character of said bits allocated to said VPI.

17. The hardware of claim 11 further comprising a cell in said first network, said cell being routed to a channel identified by the number and character of said bits allocated to said VCI.

18. In an ATM system, including a first network having a plurality of hardware connections, identified by a virtual path index (VPI) and a virtual channel index (VCI), and a second network having requirements for interconnections with at least some of said connections in said first network, hardware in said first network for optimizing the interconnection between said second network and said first network, comprising:

a VPCI extraction mechanism;

a search engine;

a memory device storing values representing a number of path bits allocated to said VPI and a number of channel bits allocated to said VCI, wherein a number of bits are selectively allocated to each of said VPI and VCI fields corresponding at least in part to the interconnection requirements of said second network; and a tag adder, whereby the number and character of said bits optimize the interconnection between said second network and said first network.

* * * * *